United States Patent [19]

Greenspan

[11] 4,251,992

[45] Feb. 24, 1981

[54] PNEUMATIC PROPULSION SYSTEM

[76] Inventor: Peter D. Greenspan, 164 NW. Broad St., Southern Pines, N.C. 28387

[21] Appl. No.: 85,773

[22] Filed: Oct. 17, 1979

[51] Int. Cl.³ .............................................. F02C 1/02
[52] U.S. Cl. ................................................... 60/412
[58] Field of Search .......................... 60/412, 407, 370

[56] References Cited

U.S. PATENT DOCUMENTS

| | | | |
|---|---|---|---|
| 3,379,008 | 4/1968 | Manganaro | 60/412 X |
| 3,925,984 | 12/1975 | Holleyman | 60/412 X |
| 4,060,987 | 12/1977 | Fisch | 60/412 X |
| 4,124,978 | 11/1978 | Wagner | 60/412 X |

Primary Examiner—Allen M. Ostrager
Attorney, Agent, or Firm—Mills & Coats

[57] ABSTRACT

The present invention relates to a new and unique propulsion system that comprises a source of compressed air housed within a tank and wherein the propulsion system is adapted to selectively deliver the pressurized air from said tank to a turbine motor where the air drives the turbine motor and an output drive shaft associated therewith. In addition, a driven vacuum pump system is communicatively connected to said turbine motor and adapted to evacuate air therefrom and to direct the evacuated air back to the tank to form a hermetically closed pneumatic circulatory air circuit system.

12 Claims, 2 Drawing Figures

PNEUMATIC PROPULSION SYSTEM

The present invention relates to propulsion systems and power plants, and more particularly to a propulsion system characterized by a closed circulatory system of air that is continuously pressurized and flow regulated to drive a turbine motor.

BACKGROUND OF INVENTION

For years now, the combustion engine has been the predominant source of power for land and water vehicles, as well as aircraft. As the number of vehicles have steadily increased, along with greater awareness of the energy crisis and the demand for cleaner air and environment, the disadvantages and shortcomings of the combustion engine have become more apparent and obvious. In this regard, the combustion engine is basically and fundamentally an inefficient power source and even under the best of controls, emits pollutant gases that are harmful and unhealthy. Additionally, combustion engines are noisy, large and bulky in terms of their horsepower capacity and, of course, requires petroleum fuel which is increasingly in short supply. Moreover, the life of combustion engines is limited, and they require substantial maintenance and upkeep and often require expensive and troublesome repair.

In short the conventional combustion engine is an inherently inefficient power source and does not adequately meet the present needs and requirements of today's people. There is a real need for a clean, efficient propulsion system that is dependable as well as reliable and which does not depend on petroleum fuel to the degree of dependence of the conventional combustion engine. The CO, hydrocarbon result is a lethal poison and dreaded environmental concern. Certainly the air quality indexes in this country as well as other lands will not support $O_2$ replenishment forever as the current hydrocarbon increment rate increases.

SUMMARY OF INVENTION

The present invention presents a pneumatic propulsion system that is designed to overcome the disadvantages and shortcomings of the conventional combustion engine and to provide a reliable and clean power source.

Basically the pneumatic propulsion system of the present invention comprises a tank adapted to contain air under pressure and to selectively direct the pressurized air thereof into and through a turbine motor which has an output drive shaft associated therewith. As air under pressure is directed from said tank into and through said turbine motor, the same results in the turbine motor being driven so as to drive the output shaft thereof, which may be in turn operatively connected to a transmission, power generator, or other drive coupling device to perform and accomplish the particular work desired. In addition, in the preferred embodiment disclosed herein, a vacuum pump system is operatively connected to the turbine motor and driven so as to evacuate air therefrom and to direct the air back to the tank where the same air is held under pressure for selective plenum direction back to the turbine motor. It is thusly appreciated that the pneumatic propulsion system of the present invention is closed inasmuch as air is continuously circulated from the tank, through the turbine motor, through the vacuum pump system, and back to the tank.

It is, therefore, an object of the present invention to provide a novel, unique and unusual propulsion system that is superior in performance and operation to any known power source, including the conventional combustion engine.

More particularly, a further object of the present invention resides in the provision of a pneumatic propulsion system that systematically releases a system of pressurized air and selectively delivers the pressurized air to a turbine motor for driving the same and an output shaft thereof.

Another object of the present invention is to provide a pneumatic propulsion system of the character just described that is of the closed hermetic and circulatory type inasmuch as the air directed to and through the turbine motor is evacuated therefrom by vacuum pump means and directed back to a storage tank for continuous use again in driving the turbine motor.

Another object of the present invention resides in the provision of a pneumatic propulsion system of the basic character described above wherein the pneumatic propulsion system is clean and does not pollute, is relatively quiet in operation, and which is relatively simple and compact.

Additionally, it is an object of the present invention to provide a pneumatic propulsion system of the type described above that is flexible and versatile in design inasmuch as the propulsion system of the present invention would be capable of being easily adapted for use in conjunction with vehicles of all types, including all or substantially all land, water and air vehicles, as well as power generators, refrigerators, air conditioners and plethora of appliances and tools.

Still a further object of the present invention resides in the provision of a pneumatic propulsion system of the character referred to above wherein the system entails an undirectional air flow path from a pressurized air tank, through a turbine motor, through vacuum pump means, and back to the tank, and wherein back flow or reverse flow is prohibited by the provision of appropriately placed one-way check valves.

Other objects and advantages of the present invention will become apparent from a study of the following description and the accompanying drawings which are merely illustrative of the present invention.

PNEUMATIC PROPULSION SYSTEM

Figure 1:
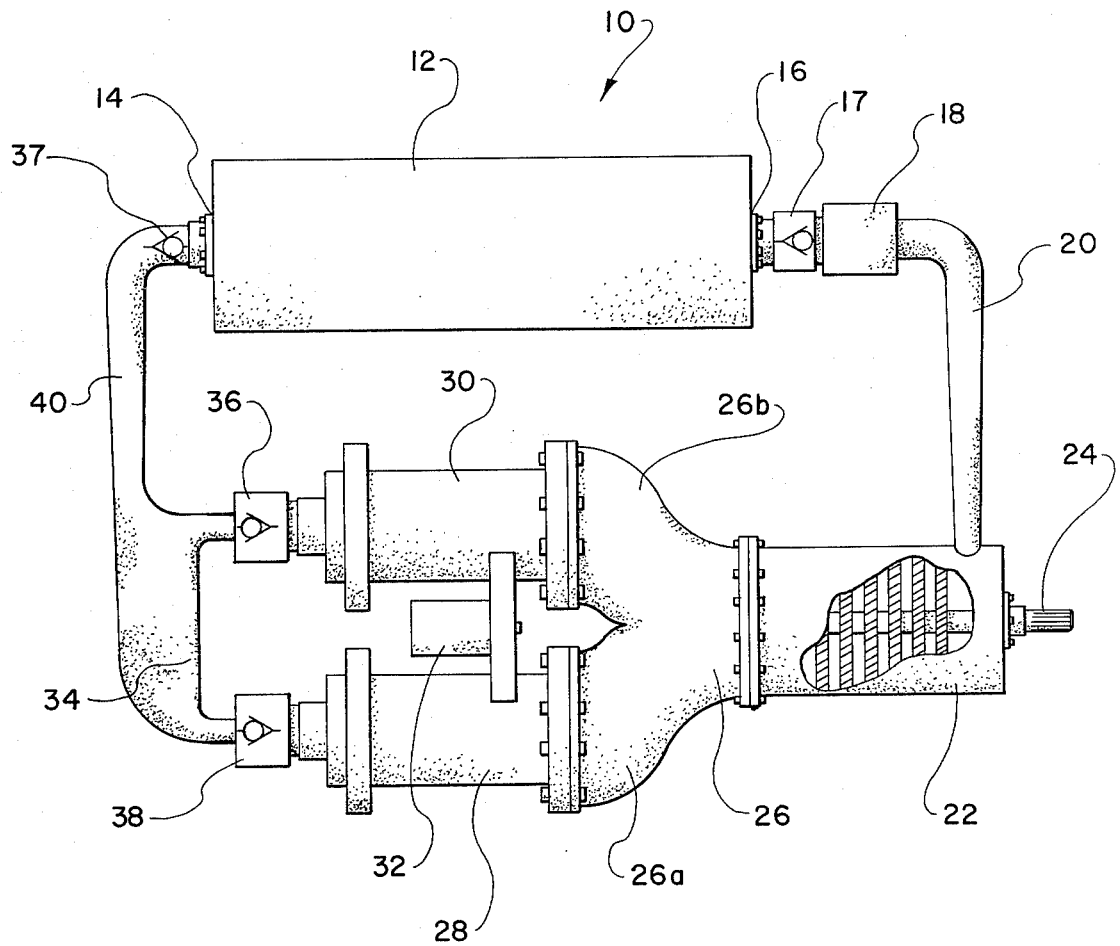
FIG. 1 is a schematic illustration of the pneumatic propulsion system of the present invention illustrating basic components thereof and the operative relationship with respect to each other.

With further reference to the drawings, the pneumatic propulsion system of the present invention is shown schematically in FIG. 1 and is indicated generally therein by the numeral 10.

Viewing pneumatic propulsion system 10 in more detail, the same comprises an air tank 12 that is adapted to contain a volume of pressurized air therein. Although the design of the air tank 12 may vary according to desired specifications and characteristics, it is contemplated that the air tank may be formed in a generally elliptical fashion with approximate dimensions of thirty inches by twenty inches by ten inches. Obviously the size and shape of tank 12 could vary depending on the capacity and other operating characteristics desired.

It is further submitted that tank 12 could be constructed of numerous suitable materials, but it is contemplated that a preferred embodiment would include an air tank constructed of aluminum with approximately two-inch thick walls. It is further submitted and contemplated that tank 12 would be suitable for safely holding and containing air at a pressure of 5K psi and would further accommodate flow therethrough of 10K SCFM.

Air tank 12 includes an intake port 14 and an output port 16, both ports being contemplated to be approximately three inches in diameter in the embodiment disclosed herein.

Operatively associated with the output port 16 would be a one-way crescent check valve 17 that would prohibit flow back through the output port into the tank 12. In addition, communicatively connected about the outside of output port 16 would be a control valve 18 for selectively controlling the flow of pressurized air from tank 12 out output port 16. In certain situations control valve 18 could be of a needle type valve where low air flow rates are involved, but in the case of high flow rates, control valve 18 would more appropriately be in the form of a spool type variable flow control valve.

Continuing to refer to the pneumatic propulsion system 10, communicatively connected to the output port 16 and extending therefrom is an outlet line 20 that could progressively decrease in diameter from three inches to approximately 2.5 inches at a point where the same is communicatively connected to an air turbine motor 22. Turbine motor 22 would have associated therewith an output shaft 24 such that as air is directed through the turbine motor and engages the respective phase portions thereof such would cause output shaft 24 to turn accordingly. In the case of the embodiment illustrated herein, it is contemplated that the turbine motor 22 could be a seven-phase type, but it is to be understood that for various conditions and performances, the number of turbine motors as well as the phases in each could vary.

Communicatively connected with air turbine motor 22 opposite output shaft 24 is a dual vacuum manifold 26 that is connected in a seal relationship such that air exiting the turbine motor 22 is constrained to move to and within vacuum manifold 26. As illustrated in the drawing, vacuum manifold 26 is of a bifurcated type that defines two separate outlet ends 26a and 26b. Outlet ends 26a and 26b of vacuum manifold 26 are communicatively connected to two vacuum pumps 28 and 30 that are in turn operatively associated with a power source 32 such as an electric motor or portable combustion engine. Vacuum pumps 28 and 30 are driven such that they evacuate air from the turbine motor 22 and pull the air through the vacuum manifold 26 directly into and through the respective vacuum pumps 28 and 30.

Communicatively connected to the output side of the vacuum pumps 28 and 30 is a return manifold 34 that is also bifurcated in that the respective portions leading from the vacuum pumps 28 and 30 merge together to communicatively connect to a return line 40 that leads back to the air tank 12 and specifically is communicatively connected in an air tight sealed relationship to intake port 14 of the air tank 12. It is to be appreciated that the return line 40 may vary in diameter if so desired, such as varying from 2.5 inches at the connection point with the return manifold 34 to three inches where the return line communicates with intake port 14.

As further protection against reverse flow and to assure that air flows in one direction through the pneumatic propulsion system 10 of the present invention, one-way check valves 36 and 38 are provided about the output side of the vacuum pump 28 and 30 to assure that air is not directed back through the vacuum pumps into the air turbine motor 22.

In operation, air under pressure is contained within tank 12 and is selectively directed therefrom by control valve 18. It is appreciated that one-way check valve 17 assure that air is directed only from output port 16 through line 20 into turbine motor 22. Control valve 18 is adapted to control air flow from zero to 7,500 SCFM.

Therefore, it is appreciated that air under pressure direct from tank 12 through inlet line 20 and into the turbine motor 22 causes the same to turn and to drive the associated output shaft 24. Again, as already discussed, output shaft 24 can be operatively connected to a transmission or other drive coupling device. Air directed through the turbine motor 22 is evacuated therefrom opposite drive shaft 24 through a vacuum manifold 26 that is in turn communicatively connected to a vacuum pumping system 28 and 30. The driven vacuum pumps 28 and 30 are operative to evacuate air passing through the turbine motor 22 and each vacuum pump has an output side that directs air through one-way check valves 36 and 38 into a return manifold 34 that is in turn communicatively connected to a return line 40 which leads back to the air tank 12 and particularly to intake port 14 thereof. This process is continuously carried out in a circulatory fashion such that air is continuously circulated from the tank, through the turbine motor, on through the vacuum pumps 28 and 30 and directed back to tank 12. It is appreciated that the vacuum pumps 28 and 30 would in effect be sufficiently driven so as to maintain the air within tank 12 in a desired pressurized state.

Figure 2:
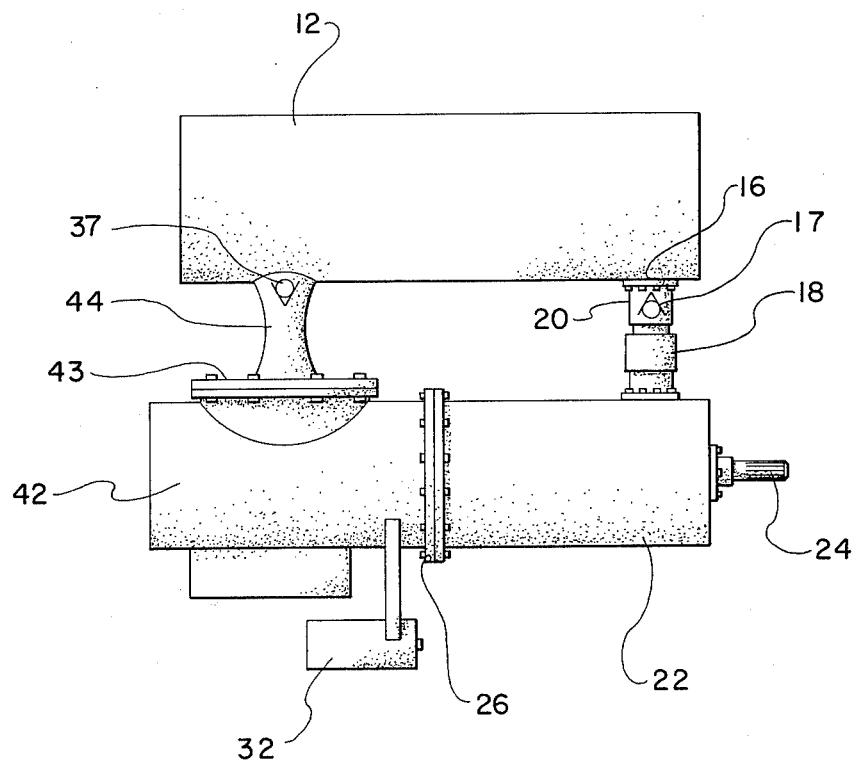
FIG. 2 is a schematic illustration of the pneumatic system of the present invention illustrating basic components thereof, including a single rather than dual vacuum system, and the operative relationship of the various components with respect to each other.

Referring to the pneumatic propulsion system 10 shown in FIG. 2, communicatively connected to the output port 16 and extending therefrom is an outlet line 20 that allows sufficient quantities of air to exhaust from tank 12 and enter air turbine motor 22, as just described.

Communicatively connected with air turbine motor 22 opposite output shaft 24 is a single vacuum manifold 26 that is connected in a seal relationship such that air exiting the turbine motor 22 is constrained to move to and within vacuum manifold 26. As illustrated in FIG. 2, vacuum manifold 26 is a single type that contains one outlet. The outlet end of manifold 26 is communicatively connected to vacuum pump 42 that is in turn operatively associated with a power source 32 such as an electric motor or portable combustion engine. The vacuum pump rotor is driven such that it evacuates air from the turbine motor 22 and pulls the air through the vacuum pump 42.

Communicatively connected to the output side of the vacuum pump 42 is a return manifold 43 that leads from the vacuum pump 42 to communicatively connect to a return line 44 that leads back to the air tank 12, and specifically is communicatively connected in an air tight sealed relationship to intake port 14 of air tank 12. It is to be appreciated that the return line 44 may vary in diameter if so desired such as varying from 17 inches at the connection point with the return manifold 43 to 7.5 inches at the connection point where the return line communicates with intake port 14 of the air tank. The contact point of vacuum pump to return manifold may be sealed and bolted. The manifold 43 directs a controlled flow to the vacuum pump 42, through to the air tank 12 for recycling.

As further protection against reverse flow and to assure that air flows in one direction through the pneumatic propulsion system 10 of the present invention, one-way check valve 37 is provided about the output side of the vacuum pump 42 to assure that air is not directed back through the vacuum pump into the air turbine motor 22.

Therefore, it is appreciated that air under pressure directed from tank 12 through inlet line 20 and into the turbine motor 22 causes the same to turn and to drive the associated output shaft 24. Again as already discussed, output shaft 24 can be operatively connected to a transmission or other drive coupling device. Air directed through the turbine motor 22 is evacuated therefrom opposite drive shaft 24 through a vacuum manifold 26 that is in turn communicatively connected to a molecular ultra high vacuum pump 42. The drive pump 42 is operative to evacuate air passing through the turbine motor 22 and the vacuum pump 42 has an output side that directs air through one-way check valve 37 into a return manifold 43 that is in turn communicatively connected to a return line 44 which leads back to the air tank 12 and particularly to input port 14 thereof. This process is continuously carried out in a circulatory fashion such that air is continuously circulated from the tank, through the air turbine motor, on through the ultra high molecular vacuum pump 42, and directed back to tank 12. It is appreciated that the vacuum pump 42 would in effect free wheel and be sufficiently driven so as to maintain the air within tank 12 in a desired pressurized state.

Details of certain components of the pneumatic propulsion system 10 are not dealt with herein in detail because such components viewed individually are not material to the present invention per se and further such components are known and available commercially today. The present invention and the pneumatic propulsion system 10 results from the combination of individual components operatively connected in the manner hereinabove described. Additionally, it is appreciated that the propulsion system 10 could be provided with an encapsulated sound proof enclosure for suppressing even the least bit of noise generated by its operation.

From the foregoing specification, it is appreciated that the pneumatic propulsion system 10 of the present invention is novel, unique and unusual inasmuch as it presents a propulsion system that is driven by a pneumatic pressurized system of air. Unlike the conventional combustion engine, the pneumatic propulsion system of the present invention is clean, relatively quiet, and does not depend on petroleum fuel to the degree that a conventional combustion engine does. Furthermore, the pneumatic propulsion system of the present invention is very efficient, relatively simple and inexpensive, and compact.

Additionally, it should be noted that the species shown in FIGS. 1 and 2 include a one-way check valve 37 at the input port 14 of tank 12.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An ultra high turbomolecular vacuum exhaust/injection pneumatic propulsion system comprising:
    a. a vacuum injected vessel adapted to contain exhaust precompressed gas and including inlet and outlet ports;
    b. a gaseous outlet line communicatively connected to said output port of said vacuum injected vessel;
    c. a bladed gaseous turbine motor operatively connected to said outlet line for receiving prepressurized constant gas from said vacuum injected vessel through said outlet line for supplying drive air for said air tubine motor;
    d. a rotating output drive shaft operatively associated with said gaseous turbine motor and driven in response to said turbine motor being driven;
    e. control valve means operatively associated with said propulsion system for controlling and regulating the flow rate of precompressed drive gas from said vacuum injected vessel to said bladed turbine motor thereby enabling the revolutions per minute of said output shaft to be accordingly regulated;
    f. ultra high turbomolecular vacuum means operatively associated with said gaseous turbine motor for evacuating precompressed gas therefrom, said ultra high turbomolecular vacuum means including rotor and stator combinations for driving gaseous contents away from said turbine hence exhausting the air turbine motor;
    g. power source means for driving said ultra high turbomolecular vacuum exhaust device; and
    h. return line means operatively interconnected between said ultra high turbomolecular exhaust device and said intake port of said vacuum injected vessel for directing prepressurized exhausted gas from said air turbine bladed motor back to said vacuum injected vessel wherein said ultra high turbomolecular vacuum device means further acts to deliver air to said vacuum injected vessel under constant pressure where the same prepressurized air contained within said vacuum injected vessel can be redirected back through the system for driving said air turbine motor in a cyclical unidirectional jet stream.

2. The turbomolecular ultra high vacuum exhaust bladed propulsion system of claim 1 wherein said turbomolecular device means includes two vacuum pumps in side by side relationship and wherein there is provided a vacuum manifold operatively interconnected between said air turbine motor device and said turbomolecular vacuum device with said vacuum manifold being of a bifurcated design including two inlets that extend from a single outlet communicatively connected to said air turbine motor, said inlets further being communicatively connected to input sides of said turbomolecular vacuum devices in tandem.

3. The turbomolecular ultra high vacuum exhaust injected bladed propulsion system of claim 1 wherein the propulsion system includes a return manifold communicatively connected to output sides of said turbomolecular device with said return manifold being of a bifurcated design with two tandem dual outlet ends communicatively connected to said vacuum device and which further merge together to connect to said return line means.

4. The turbomolecular ultra high vacuum exhaust injected bladed propulsion system of claim 3 wherein the same comprises one way check valve means strategically located within the propulsion system to assure the unidirectional jet stream flow of gaseious content through the system.

5. The ultra high vacuum turbomolecular exhaust bladed turbine propulsion system of claim 4 wherein said control valve means is operatively interconnected between the output port of said vacuum injected vessel and said bladed air turbine motor.

6. The turbomolecular ultra high vacuum exhaust bladed air turbine motor of claim 5 wherein said return line means includes a return line communicatively connected to the return manifold for directing gaseous content therefrom back to the intake port of said vacuum injected vessel; and wherein said outlet line is tapered slightly to accommodate bladed air turbine motor coupling input port.

7. The ultra high turbomolecular vacuum exhaust bladed air turbine motor propulsion system of claim 6 wherein said vacuum injected vessel is constructed of lightweight suitable material in an elliptical shape.

8. The ultra high turbomolecular vacuum exhaust injected bladed air turbine motor propulsion system of claim 7 wherein said means for driving said turbomolecular vacuum device comprises an electric variable speed motor operatively connected thereto for imparting driving torque to said turbomolecular vacuum device.

9. The ultra high turbomolecular vacuum exhaust bladed air turbine motor propulsion system of claim 8 wherein said bladed air turbine motor is of a multiphase bladed design.

10. The turbomolecular ultra high vacuum exhaust injected bladed propulsion system of claim 1 wherein said turbomolecular vacuum device means includes a single sole device mounted and sealed air tight wherein there is provided a vacuum manifold operatively interconnected between said air turbine motor and said vacuum device with said vacuum manifold being of a single design including a single outlet that extends from a common outlet communicatively connected to said bladed air turbine motor, said inlet further being communicated to an input fitting of single ultra high turbomolecular vacuum device.

11. The turbomolecular ultra high vacuum exhaust injected bladed propulsion system of claim 10 including a return manifold communicatively connected to an output side of said single ultra high turbomolecular vacuum pump and which further connects to said return line means.

12. The turbomolecular ultra high vacuum exhaust bladed propulsion system of claim 11 wherein said means for driving said single turbomolecular device comprises an insulated ceramic direct current electric motor to reduce ohmic heat operatively connected thereto.

* * * * *